United States Patent Office 3,644,539
Patented Feb. 22, 1972

3,644,539
SYNTHESIS OF HINDERED ALKENYL PHENOLS
William H. Starnes, Jr., Baytown, Tex., assignor to
Esso Research and Engineering Company
No Drawing. Filed July 28, 1969, Ser. No. 845,539
Int. Cl. C07c 39/18
U.S. Cl. 260—619 R    6 Claims

ABSTRACT OF THE DISCLOSURE

The hindered alkenyl phenols having the following structure are useful as antioxidants for hydrocarbons and especially for polyolefins such as polypropylene and are produced by the reaction of a 2,6-dialkylquinone methide with an aldehyde and a phosphorus compound selected from the group consisting of a trialkylphosphine and a trialkylphosphite to produce the hindered alkenyl phenol having the following structure:

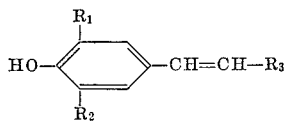

where $R_1$ and $R_2$ are alkyls having 1 to 8 carbon atoms, and
$R_3$ is selected from the group consisting of alkyl and aryl.

BACKGROUND OF THE INVENTION

(1) Field of the invention

The present invention is directed to the synthesis of hindered alkenyl phenols of the following general structure:

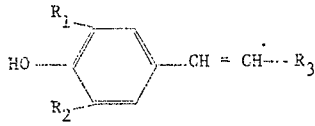

where $R_1$ and $R_2$ are alkyls having 1 to 8 carbon atoms, and
$R_3$ is selected from the group consisting of alkyl and aryl.

The synthesis of the present invention comprises reacting a 2,6-dialkylquinone methide with an aldehyde and a phosphorus compound selected from the group consisting of trialkylphosphine and trialkyl phosphites, preferably in an inert solvent.

(2) Prior art

E. Zbiral, O. Saiko, and F. Wessely, Monatshefte fur Chemie, 95, 512 (1964); Chem. Abstracts, 61, 5525 (1964); A. Nickon and B. R. Aaronoff, Journal of Organic Chemistry, 27, 3379 (1962); 29, 3014 (1964); H. D. Becker, ibid., 34, 1211 (1969).

SUMMARY OF THE INVENTION

The present invention is directed to the synthesis of hindered alkenyl phenols of the following structure:

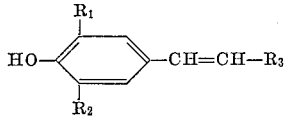

where $R_1$ and $R_2$ are alkyls having 1 to 8 carbon atoms, and
$R_3$ is selected from the group consisting of alkyl and aryl.

The synthesis method of the present invention involves the reaction of a 2,6-dialkylquinone methide with an aldehyde and a phosphorus compound. The phosphorus compound may be either a trialkylphosphine or a trialkyl phosphite. Using either of the phosphorus compounds a zwitterion (Compound A) of the following formula is produced in situ:

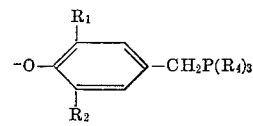

(A)

where $R_1$ and $R_2$ are lower alkyl, and
$R_4$ is a n-alkyl or alkoxy.

This zwitterion then reacts with either the aromatic or the aliphatic aldehyde used to produce the hindered alkenyl phenol.

DESCRIPTION OF THE PREFERRED EMBODIMENTS

The hindered alkenyl phenols are produced according to the synthesis method of the present invention, preferably by starting with the chloromethylphenols of the following structure:

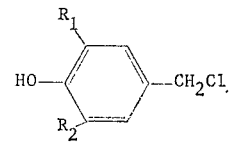

where $R_1$ and $R_2$ are alkyls.

While $R_1$ and $R_2$ may be $C_1$ to $C_8$ alkyls, for effective antioxidant compounds these substituents are preferably tertiary alkyls such as t-butyl. The chloromethyl hindered phenol is then reacted with a t-amine, according to known reactions, to produce the quinone methide structure which is the essential starting material in the synthesis method of the present invention. The quinone methide will have the following structure:

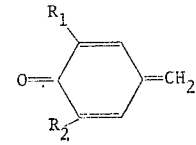

where $R_1$ and $R_2$ are alkyls.

The synthesis method of the present invention involves the reaction of the quinone methide with an aldehyde and a phosphorus compound, either a trialkylphosphine or a trialkyl phosphite. It is usually preferred to carry out the reaction in an aprotic solvent such as benzene, heptane, petroleum ether, tetrahydrofuran, or dimethylformamide. The reaction, however, may be carried out in other inert solvents such as heptane-ethanol mixtures, petroleum ether-ethanol mixtures, and the like at temperatures from room temperature to the reflux temperature of the solvent used. The hindered alkenyl phenol produced in the reaction may be conveniently recovered by conventional separation techniques, e.g., by fractional distillation of the crude reaction mixture.

The aldehyde which is used in the synthesis method of the present invention may be either an alkyl or aryl aldehyde. Suitable aldehydes are benzaldehyde, n-heptaldehyde, alpha-naphthaldehyde, the isomeric tolualdehydes, the isomeric chlorobenzaldehydes, acetaldehyde, propionaldehyde, isobutyraldehyde, and pivaldehyde.

The phosphorus compound used in the synthesis method of the present invention is either a trialkylphosphine or a trialkyl phosphite. The alkyl groups in either the phosphine or phosphite compounds are preferably the $C_1$ to $C_8$ n-alkyls. Suitable phosphorus compounds are tri-n-butylphosphine, tri-n-octylphosphine, trimethyl phosphite, triethyl phosphite, and tri-n-hexyl phosphite.

The present invention will be further illustrated by the following specific examples which are given by way of illustration and not as limitations on the scope of the invention.

EXAMPLE 1

Preparation of trans-3,5-di-t-butyl-4-stilbenol from quinone methide ($R_1=R=$t-butyl), tri-n-butylphosphine and benzaldehyde A solution of the quinone methide, prepared in the usual way (see above) from 2,6-di-t-butyl-4-chloromethylphenol (20.40 g., 80.1 mmoles) and triethylamine (8.44 g., 83.4 mmoles) in benzene (500 ml. total, including 100 ml. used to wash the precipitated amine hydrochloride) was added slowly (1 hour) under nitrogen to a well-stirred, degassed solution of tri-n-butylphosphine (16.21 g., 80.1 mmoles) and benzaldehyde (9.29 g., 87.5 mmoles) in benzene (80 ml.). The temperature of the mixture was kept at 50° C. during the addition and for 6.5 hours after the addition was complete. Heating and stirring were then discontinued, and the mixture was allowed to stand overnight at room temperature under nitrogen. After having been washed in succession with three 200-ml. portions of 5% hydrochloric acid and three 200-ml. portions of 2 N sodium carbonate, the organic solution was dried over Drierite, concentrated by evaporation, and distilled through a 24-plate spinning band column at reduced pressure. The fraction boiling at 171–178° C. (0.25–0.33 mm.) weighed 15.32 g. (62% yield) and afforded 12.52 g. (51% yield) of pure trans-3,5-di-t-butyl-4-stilbenol, M.P. 93–94° C., after crystallization from aqueous methanol.

EXAMPLE 2

Preparation of trans-3-5-di-t-butyl-4-stilbenol from quinone methide ($R_1=R_2=$t-butyl), triethyl phosphite, and benzaldehyde A solution of the quinone methide (0.04 M), triethyl phosphite (0.08 M), benzaldehyde (1.6 M), and triethylamine (0.004 M) in n-heptane was allowed to stand at room temperature for 3 days. Analysis of the mixture by programmed-temperature vapor phase chromatography showed that 3,5-di-t-butyl-4-stilbenol and triethyl phosphate had been formed in yields amounting to 26±3% and 22±3%, respectively. The identities of these products were confirmed by comparing their retention times and the ir, nmr, and mass spectra of trapped fractions with those of authentic samples.

In a second experiment, a solution of the quinone methide (0.04 M), triethyl phosphite (0.08 M), benzaldehyde (1.6 M), triethylamine (0.004 M), and ethanol (0.69 M) in n-heptane was allowed to stand at room temperature for two days. Vapor phase chromatography showed that the stilbenol and the phosphate had been formed in yields of 46±3% and 47±3%, respectively.

The triethylamine present in these mixtures has no effect on the reaction. The presence of the amine is caused by the use of a slight excess of amine in order to insure quantitative formation of the quinone methide from 2,6-di-t-butyl-4-chloromethylphenol.

The hindered alkenyl phenols which are synthesized according to the present invention may be used as stabilizers in polyolefins. When used as stabilizers in polyolefins, the hindered alkenyl phenols may be used with a sulfur-containing costabilizer compound exemplified by the thio esters such as dilauryl thiodipropionate, distearyl thiodipropionate, dilauryl sulfoxydipropionate, distearyl trithiodipropionate, and other sulfur-containing compounds such as dicetyl sulfide, dicetyl disulfide and the like. The hindered alkenyl phenols as well as the sulfur-containing costabilizer compounds may be used in amounts from about 0.05 to about 1% by weight, with a preferred amount from about 0.1 to 0.5% by weight. The polyolefin polymers which may be stabilized are polymers of olefins having 2 to 8 carbon atoms in the molecule and may suitably be exemplified by polyethylene, polypropylene, ethylenepropylene copolymers, ethylene-butene-1 copolymers, ethylene-pentene-1 copolymers and the like having molecular weights in the range from about 10,000 to about 1,000,000. These polymers are produced by polymerization of the corresponding olefins employing the Ziegler-type polymerization catalyst.

To illustrate the antioxidant properties of the hindered alkenyl phenols of the present invention, trans-3,5-di-t-butyl-4-stilbenol is compared with two commercial inhibitors. In Table I below, the data show that the compound synthesized according to the present invention in accordance with Examples 1 and 2 is a superior antioxidant in a single-compound system, as well as in a synergistic system containing a thioester.

TABLE I.—POLYPROPYLENE STABILITY DATA

| Stabilizer | Weight percent | Days to failure [a] (at 115.5° C.) |
| --- | --- | --- |
| 3,5-di-t-butyl-4-stilbenol [b] | 0.5 | 17 |
| Santowhite [c] | 0.5 | 8 |
| Ionol [d] | 0.5 | 5 |
| 3,5-di-t-butyl-4-stilbenol, DLTDP [e] | 0.1, 0.2 | 33 |
| Ionol, DLTDP | 0.1, 0.2 | 20 |

[a] For 62-mil plaques in a forced-draft circulating air oven.
[b] Trans isomer.
[c] 1,1-bis(4-hydroxy-2-methyl-5-t-butylphenyl)butane.
[d] 2,6-di-t-butyl-p-cresol.
[e] Dilauryl 3,3'-thiodipropionate.

The nature and objects of the present invention having been completely described and illustrated, what I wish to claim as new and useful and secure by Letters Patent is:

1. A process for producing a hindered alkenyl phenol which comprises:

reacting a 2,6-dialkyl quinone methide with an aldehyde of the formula: $R_3CHO$ and a phosphorus compound selected from the group consisting of a trialkylphosphine and a trialkyl phosphite to produce a hindered alkenyl phenol of the structure:

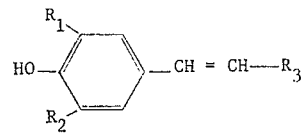

where
$R_1$ and $R_2$ are alkyl and
$R_3$ is selected from the group consisting of alkyl and aryl.

2. A process according to claim 1 wherein the alkyl of said 2,6-dialkyl quinone methide has 1 to 8 carbon atoms.

3. A process according to claim 1 wherein said aldehyde is an aliphatic aldehyde.

4. A process according to claim 1 wherein said aldehyde is an aromatic aldehyde.

5. A process for producing a hindered alkenyl phenol which comprises:

reacting 2,6-di-t-butyl quinone methide with benzaldehyde and tri-n-butylphosphine to produce a hindered alkenyl phenol of the structure:

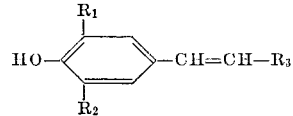

where
$R_1$ and $R_2$ are t-butyl and
$R_3$ is phenyl.

6. A process for producing a hindered alkenyl phenol which comprises:
reacting 2,6-di-t-butyl quinone methide with benzaldehyde and triethylphosphite to produce a hindered alkenyl phenol of the structure:

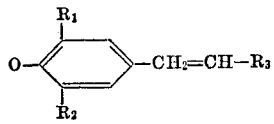

where
$R_1$ and $R_2$ are 1-butyl and
$R_3$ is phenyl.

References Cited
UNITED STATES PATENTS
3,177,153   4/1965   Pommer et al. _____ 260—619 B

FOREIGN PATENTS
699,180   11/1953   Great Britain _____ 260—619 B

BERNARD HELFIN, Primary Examiner

U.S. Cl. X.R.

260—624 R